United States Patent
Prexl et al.

(10) Patent No.: US 7,518,346 B2
(45) Date of Patent: Apr. 14, 2009

(54) BUCK-BOOST DC/DC CONVERTER WITH OVERLAP CONTROL USING RAMP SHIFT SIGNAL

(75) Inventors: Franz Prexl, Niederding (DE); Erich Bayer, Thonhausen (DE); Juergen Neuhaeusler, Bad Aibling (DE)

(73) Assignee: Texas Instruments Deutschland GmbH, Freising (DE)

( * ) Notice: Subject to any disclaimer, the term of this patent is extended or adjusted under 35 U.S.C. 154(b) by 60 days.

(21) Appl. No.: 11/681,672

(22) Filed: Mar. 2, 2007

(65) Prior Publication Data

US 2007/0210782 A1    Sep. 13, 2007

Related U.S. Application Data

(60) Provisional application No. 60/882,410, filed on Dec. 28, 2006.

(30) Foreign Application Priority Data

Mar. 3, 2006   (DE)  ........................ 10 2006 009 956

(51) Int. Cl.
*G05F 1/10* (2006.01)
*G05F 1/652* (2006.01)
(52) U.S. Cl. ........................ 323/222; 323/282; 323/284; 323/268; 323/270
(58) Field of Classification Search ................. 323/222, 323/282, 284, 285, 268, 270
See application file for complete search history.

(56) References Cited

U.S. PATENT DOCUMENTS

| | | | |
|---|---|---|---|
| 5,402,060 A | 3/1995 | Erisman | |
| 6,166,527 A | 12/2000 | Dwelley et al. | |
| 6,215,286 B1 | 4/2001 | Scoones et al. | |
| 6,348,781 B1 | 2/2002 | Midya et al. | |
| 7,042,199 B1 * | 5/2006 | Birchenough | ................ 323/271 |

* cited by examiner

FOREIGN PATENT DOCUMENTS

EP    1601091    11/2005

*Primary Examiner*—Bao Q Vu
(74) *Attorney, Agent, or Firm*—John J. Patti; Wade J. Brady III; Frederick J. Telecky, Jr.

(57) ABSTRACT

A buck-boost DC/DC converter includes an inductor and a power stage having a set of switches selectively connecting the inductor between a voltage input, a voltage output and a reference level in accordance with buck or boost mode. The converter has a switch control providing control signals to the set of switches in the power stage. A comparator provides to the switch control a first pulse width modulation signal in buck mode and a second pulse width modulation signal in boost mode. A ramp generator provides to the comparator a first ramp signal for buck mode and a second ramp signal for boost mode. An overlap control provides a ramp shift signal to the ramp generator in response to a detection signal that indicates activity of the switches in the power stage. The ramp shift signal adjusts the first and second ramp signals relative to each other so as to minimize any gap and any overlap between the first and second ramp signals. Whenever actuation of all switches in the power stage within the same clock period is detected, the ramp signals are adjusted in a way to reduce the overlap between the ramp signals. Conversely, when no switch activity is detected in a clock period, the ramp signals are adjusted in a waye to increase the overlap between the ramp signals. As a result, when the input voltage is close to the output voltage, the converter alternatively operates in buck mode or in boost mode, avoiding a buck-boost mode.

14 Claims, 3 Drawing Sheets

BUCK-BOOST DC/DC CONVERTER WITH OVERLAP CONTROL USING RAMP SHIFT SIGNAL

The invention relates to a buck-boost DC/DC converter with an inductor and a power stage including a set of switches selectively connecting the inductor between a voltage input, a voltage output and a reference level (ground) in accordance with buck or boost mode.

BACKGROUND

Conventionally, two ramp signals are used to control the duty cycle of the switches in the converter, one for buck operation and one for boost operation. Comparators compare the output signal of an error amplifier with the ramp signals to generate the pulse width modulation signal for controlling the switches in the converter stage. In buck operation, the input signal is higher than the output signal. In boost operation, the input signal is lower than the output signal. When the input voltage is in a range close to the output voltage, a change between buck and boost mode occurs. The change between buck and boost mode involves a discontinuity in the transfer function at the transition point. A gap between the ramp signals would result in an interruption of the pulse width modulation, and unpredictable low frequency noise would occur.

To avoid this problem, conventional approaches provide a wide overlap between the two ramp signals. Due to the overlap between the ramp signals, the switches in the converter power stage are operated in both of the buck mode and the boost mode. In the overlap region, the converter operates in a buck-boost mode. With a wide overlap, buck-boost operation results over a wide range of supply voltage. While the buck-boost operation avoids the discontinuity problem, this is achieved at the expense of efficiency. Due to the actuation of all the switches in the power stage in each clock period, a lot of energy is lost by dissipation. The result is an efficiency curve with a dip in the range where the supply voltage is close to the output voltage. Since this is a condition in which the converter is operated most of the time, the reduced efficiency in buck-boost operation is a major drawback.

SUMMARY

The invention provides a buck-boost DC/DC converter which avoids the buck-boost operation in the range where the supply voltage is close to the output voltage, thereby improving the efficiency in that range.

In a described example embodiment, the invention provides a buck-boost DC/DC converter with an inductor and a power stage having a set of switches selectively connecting the inductor between a voltage input, a voltage output and a reference level (ground) in accordance with buck or boost mode. The converter has a switch control block providing control signals to the set of switches in the power stage. A comparator block provides a first pulse width modulation signal to the switch control block in buck mode and a second pulse width modulation signal to the switch control block in boost mode. A ramp generator block provides a first ramp signal to the comparator block for buck mode and a second ramp signal to the comparator block for boost mode. An overlap control block provides a ramp shift signal to the ramp generator in response to a detection signal that indicates activity of the switches in the power stage.

The ramp shift signal adjusts the first and second ramp signals relative to each other so as to minimize any gap and any overlap between the first and second ramp signals. Whenever actuation of all switches in the power stage within the same clock period is detected, the ramp signals are adjusted in a way to reduce the overlap between the ramp signals. Conversely, when no switch activity is detected in a clock period, the ramp signals are adjusted in a way to increase the overlap between the ramp signals. As a result, when the input voltage is close to the output voltage, the converter alternatively operates in buck mode or in boost mode, avoiding operation in a buck-boost mode. Also, since the ramp signals are adjusted by a closed loop, any offsets and temperature drifts are cancelled automatically.

In an example embodiment, a convenient way to adjust the ramp signals is to modulate the charge currents to the capacitors used in the ramp generator block.

In a preferred embodiment, the ramp signal for the buck mode has a rising slope and the ramp signal for the boost mode has a falling slope. Over conventional designs where both ramps have a positive slope, the inverted slope of the boost ramp surprisingly provides a reduced switching noise.

In the preferred embodiment, the level of the ramp signal for boost mode is shifted down to increase the overlap between the first and second ramp signals, and the level of the ramp signal for buck mode is shifted down to decrease the overlap between the first and second ramp signals. This is preferred because of a relatively simple circuit implementation. Generally, however, other kinds of adjustment are possible. In particular, it is even possible to shift the level of one ramp signal in both directions without shifting the other ramp signal.

BRIEF DESCRIPTION OF THE DRAWINGS

Further advantages and features of the invention will appear from the following detailed description with reference to the accompanying drawings, wherein.

DETAILED DESCRIPTION

Figure 1:
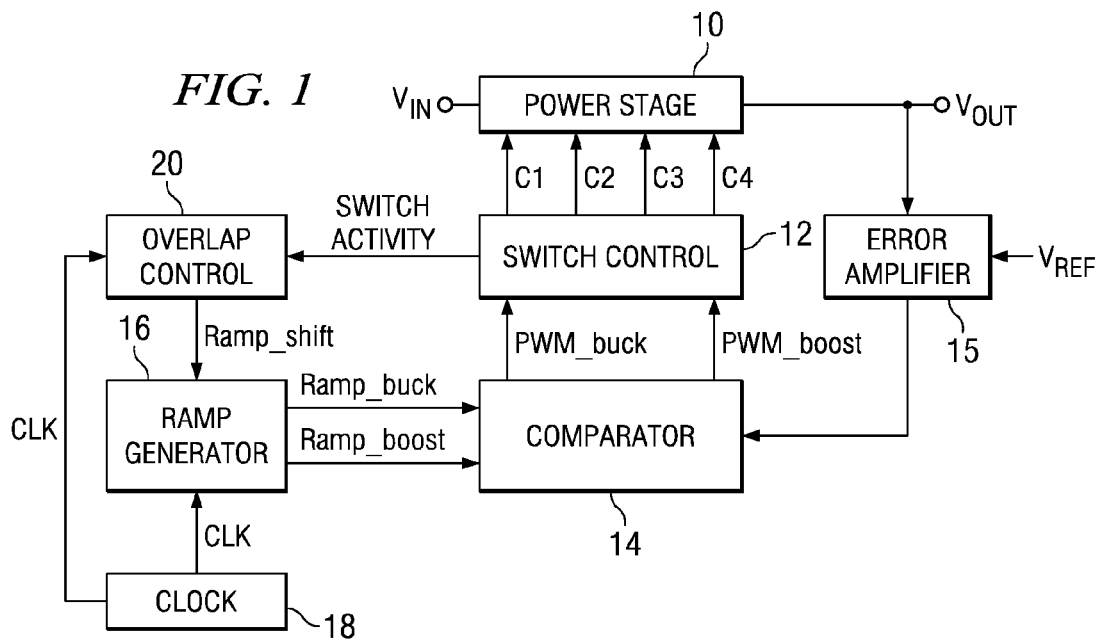
FIG. 1 is a block diagram of an example embodiment of a DC/DC converter, illustrating principles of the invention.

With reference to FIG. 1, the illustrated buck-boost DC/DC converter has a power stage 10 with a supply voltage input $V_{IN}$, an output $V_{OUT}$, and switch control inputs C1 to C4. The switch control signals C1 to C4 are supplied by a switch control 12 which receives pulse width modulated signals PWM_buck and PWM_boost from a comparator 14. As one of its inputs, the comparator 14 receives the output signal of an error amplifier 15, which compares the output voltage $V_{OUT}$ with a reference signal $V_{REF}$. Two further inputs to comparator 14 are ramp signals Ramp_buck and Ramp_boost from a ramp signal generator 16. Ramp generator 16 is driven by a clock signal CLK from a clock generator 18. As a control input, the ramp generator 16 receives a ramp shift control signal Ramp_shift from a ramp overlap control 20. The ramp overlap control 20 receives a switch activity indication signal SWITCH ACTIVITY from switch control 12, thereby closing a control loop.

Although the described elements are shown as separate functional blocks in FIG. 1, those skilled in the art will understand that the converter is preferably implemented as an integrated circuit and that individual circuit elements may be shared in providing the described functions.

Figure 2:
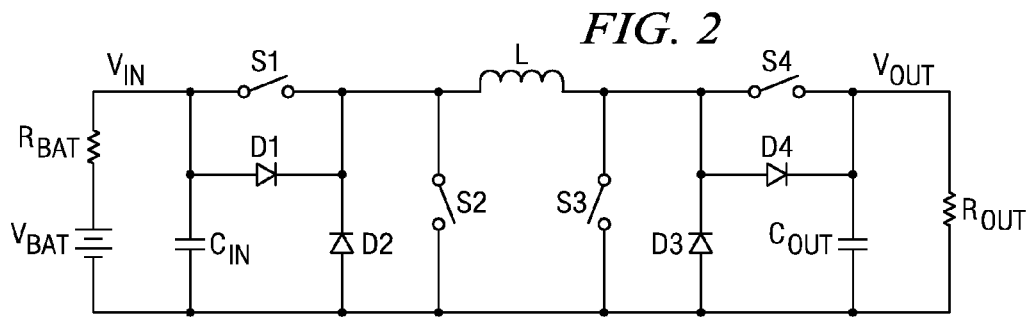
FIG. 2 is a simplified circuit diagram of an implementation of a power stage in the converter of FIG. 1.

In a typical non-inverting buck-boost converter, the power stage is configured as shown in FIG. 2. The illustrated power stage has an inductor L, four switches S1 to S4, input and output capacitors $C_{IN}$ and $C_{OUT}$ and an output load that is represented by a resistor $R_{OUT}$. A supply voltage $V_{IN}$ is taken from a battery $V_{BAT}$, the internal resistance of which is represented by a resistor $R_{BAT}$. Diodes D1 to D4 are parasitic components. The four switches are usually implemented as power MOS transistors, the gates of which are driven by the signals C1 to C2.

In buck mode, when the input voltage is higher than the output voltage, S1 and S2 are switching while S3 is open and S4 is closed. In boost mode, when the input voltage is lower than the output voltage, S3 and S4 are switching while S1 is closed and S2 is open.

The duty cycle in buck mode is defined as the "on" time of S1 divided by the clock period. It increases to approach 100% as the input voltage decreases to approach the value of the output voltage. The duty cycle in boost mode is defined as the "on" time of S3 divided by the clock period. It starts at 0% and increases as the input voltage decreases below the value of the output voltage. Changing from buck mode to boost mode and vice versa does not happen smoothly. There is a discontinuity in the transfer function at the transition point. To avoid this problem, conventionally all four switches are always clocked within one clock period. The drawback of this buck-boost operation is less efficiency due to switching losses. Also, the transition point cannot be defined accurately enough to avoid either a gap without any switching or an overlap region where all four switches are active. The discontinuity remains whenever the mode of operation changes.

Known non-inverting buck-boost converters usually regulate the duty cycle that is required for a desired output voltage by comparing two ramp generators with an error amplifier output signal. The ramps can have a saw tooth or triangular waveform. A first comparator detects when the error amplifier output crosses the bottom ramp and controls S1 and S2 accordingly. In boost mode, the error amplifier output is higher than the bottom ramp. S1 is always "on" and S2 always "off". In this case, a second comparator will detect the crossing with the top ramp which controls S3 and S4.

Figure 3:
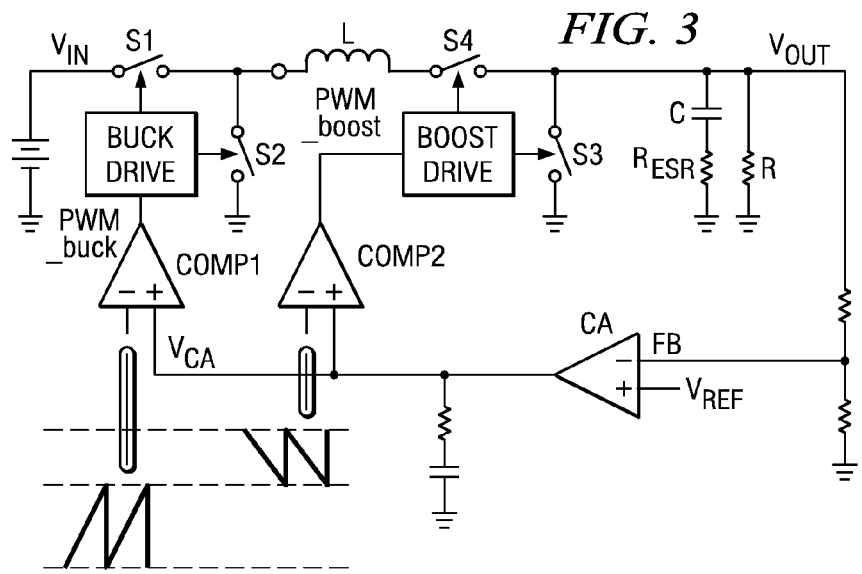
FIG. 3 is a schematic diagram of an example duty-cycle control loop in the converter.

With reference to FIG. 3, an example implementation of the improved buck-boost converter of the invention takes a similar approach, but the relationship of the ramp signals is different.

Specifically, switch control 12 in FIG. 1 is split into separate "Buck Drive" and "Boost Drive" blocks driven by signals PWM_buck and PWM_boost generated by comparators COMP1 and COMP2, respectively. Both comparators receive an output $V_{CA}$ from an error amplifier CA on their non-inverting inputs and ramp signals on the inverting inputs. The ramp signal for comparator COMP1 is a saw-tooth signal with a rising (positive) slope and a level which, in the specific example embodiment disclosed, is between 0 (ground) and $V_{IN}/2$. The ramp signal for comparator COMP2 sits "on top of" the buck ramp signal. It has a falling (negative) slope and a level which, in the specific embodiment disclosed, is between $V_{IN}/2$ and $V_{IN}/2+V_{OUT}/2$. The buck ramp is proportional to $V_{IN}$ and the boost ramp is proportional to $V_{OUT}$. The absolute height of the ramps has been chosen as high as possible within the supply range. There is neither an overlap nor a gap between the two ramp signals.

As discussed above, an overlap between the two ramps avoids discontinuity in the converter's transfer function at the expense of efficiency. A gap between the ramps would stop all activity of switches S1 to S4, producing unpredictable low frequency switching noise.

In the inventive approach, the ramp signals are adjusted with a control loop to minimize the overlap and to minimize also the gap between the ramp signals, thereby avoiding buck and boost operation within the same clock cycle. The control loop also cancels offsets and temperature drifts automatically.

Figure 4:
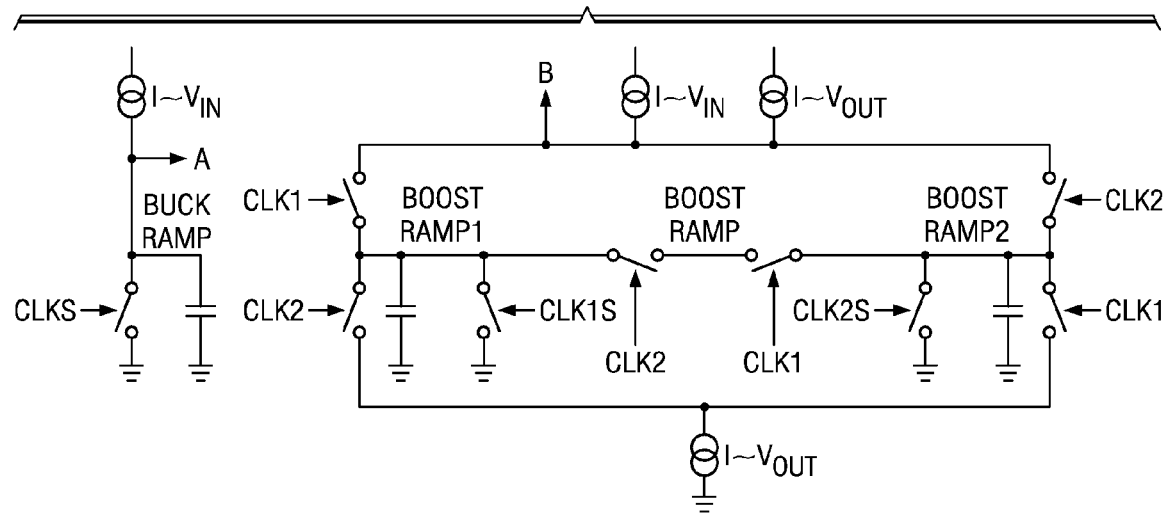
FIG. 4 is a schematic circuit diagram of an implementation of a ramp signal generator block usable in the converter.
Figure 5:
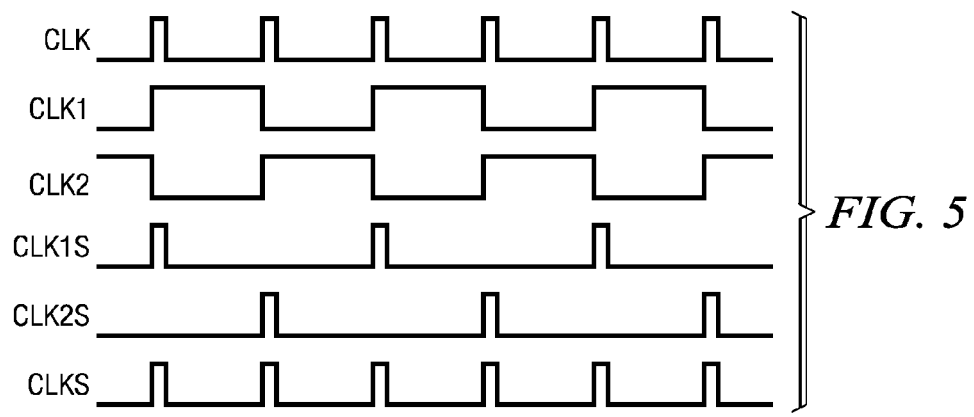
FIG. 5 is a signal diagram showing clock signals of the type usable in the ramp signal generator block.
Figure 6:
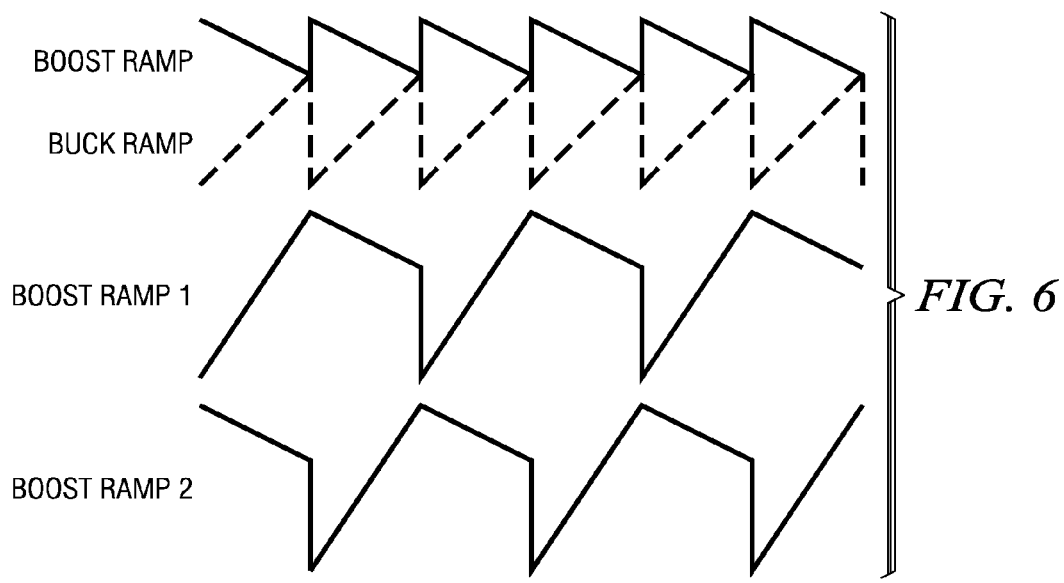
FIG. 6 is a signal diagram showing the ramp signals produced by the ramp signal generator block.

The ramp signal generator in FIG. 4 produces the buck ramp signal BUCK RAMP with a simple current source I, capacitor and a switch controlled by clock signal CLK, and the boost ramp signal BOOST RAMP with a combination of current sources, capacitors and switches controlled by clock signals CLK1, CLK2, CLK1S, CLK2S and CLKS, all derived from the clock signal CLK generated by the clock generator, as illustrated in FIG. 5. The resulting ramp signals are shown in FIG. 6.

The BOOST RAMP signal (shown in solid lines in FIG. 6) sits on top of the BUCK RAMP signal (shown in dashed lines) without any overlap and without any gap. The BOOST RAMP signal is combined from separately generated ramp signals BOOST RAMP1 and BOOST RAMP2 with the switches controlled by clock signals CLK1 and CLK2, as is easily understood. Between a node "A" and ground, a variable impedance formed by the channel of a MOS transistor (M14 in FIG. 7) is connected, as explained below with reference to FIG. 7. Similarly, between a node "B" and ground a variable impedance formed by the channel of another MOS transistor (M13 in FIG. 7) is connected, as explained below with reference to FIG. 7. With these variable impedances, the effective charge currents to the capacitors in the ramp signal generator are modulated as required.

In a preferred embodiment, the current source I for generating the BUCK RAMP signal supplies a current proportional to the input voltage $V_{IN}$. Likewise, the current sources I for the rising and falling ramps of the BOOST RAMP signal provide currents proportional to the input $V_{IN}$ and output voltages $V_{OUT}$, respectively. This feed-forward concept ensures a constant loop gain over the range of supply voltages.

Figure 7:
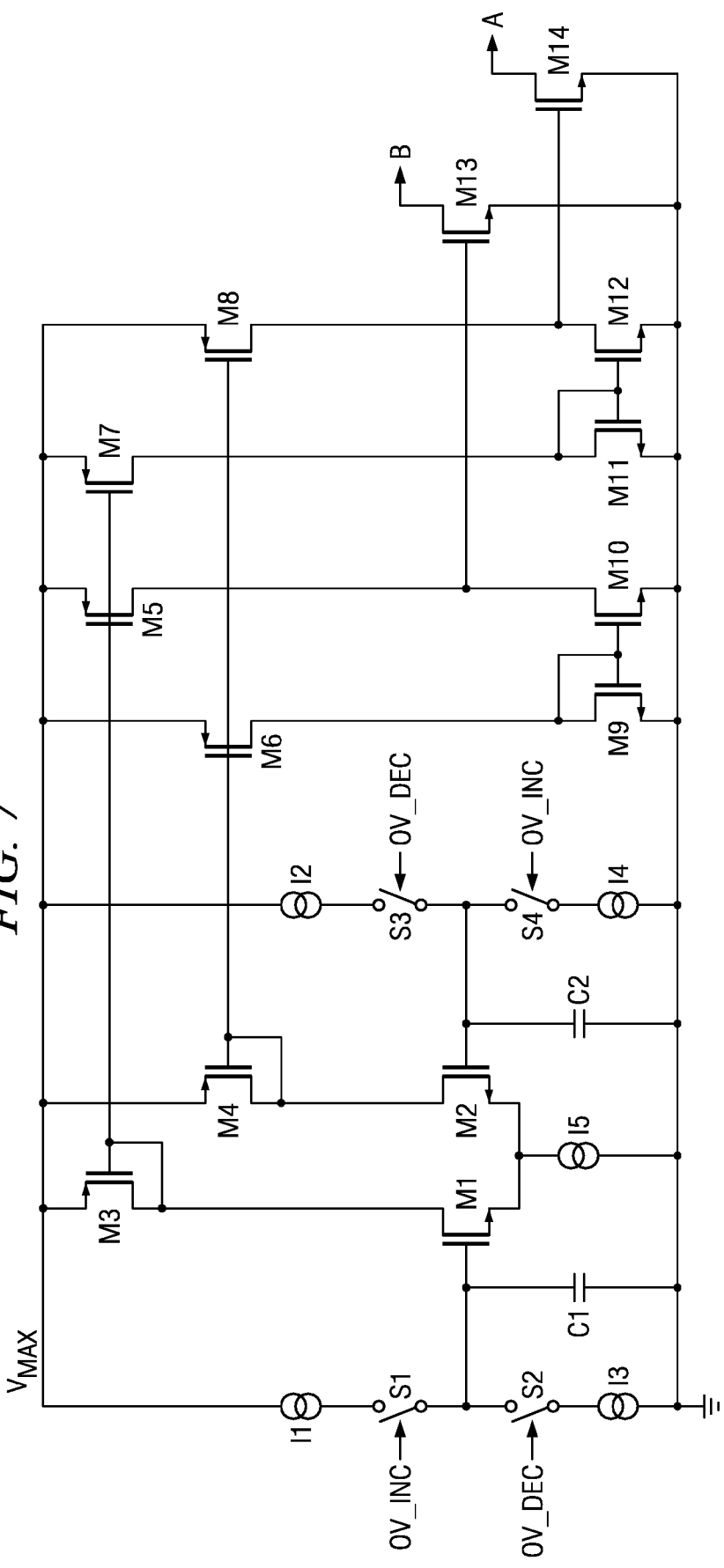
FIG. 7 is a circuit diagram of an implementation of a ramp signal overlap control block.

With reference to FIG. 7, an example implementation of the ramp overlap control block 20 of FIG. 1 receives detection signals OV_INC and OV_DEC to control switches S1 to S4. Whenever a buck and boost mode switching is detected within one clock period, S2 and S3 are closed in FIG. 7. As a result, capacitor C1 is discharged and capacitor C2 is charged, current through transistor M13 decreases, and current through transistor M14 increases. No switch activity within one clock period closes S1 and S4. As a result, capacitor C1 is charged and capacitor C2 is discharged, current through transistor M13 increases, and current through transistor M14 decreases.

The drain of transistor M13 is connected to the common node B in FIG. 4 of the two current sources I and of the two switches clocked by CLK1 and CLK2. The drain of transistor M14 is connected to the signal BUCK RAMP in FIG. 4 at node A.

In the embodiment disclosed, the variable impedance at node A in FIG. 4 is effective to reduce the maximum ramp level of the buck ramp. Similarly, the variable impedance at node B in FIG. 4 is effective to shift the bottom of the boost ramp to a lower level. This approach was chosen for simplicity of circuit design. Other approaches would be to adjust the level of the buck ramp only or of the boost ramp only, or other combinations of ramp adjustment, as long as the ramp overlap and the gap between the ramps are minimized.

An additional benefit of the invention is achieved by inverting the slope of the boost ramp relative to that of the buck ramp. As was found, the switching noise influence is reduced to a minimum with this approach.

Those skilled in the art to which the invention relates will appreciate that the described embodiments are merely examples of ways to implement the principles of the invention; and that many variations of the described embodiments and other embodiments for implementation exist within the scope of the claimed invention.

What is claimed is:

1. A buck-boost DC-DC converter with an inductor and a power stage having a set of switches selectively connecting the inductor between a voltage input, a voltage output and a reference level in accordance with buck or boost mode, comprising:
   a switch control providing control signals to the set of switches:
   a comparator providing a first pulse width modulation signal to the switch control in buck mode and a second pulse width modulation signal to the switch control in boost mode;
   a ramp generator providing a first ramp signal to the comparator for buck mode and a second ramp signal to the comparator for boost mode; and
   an overlap control providing a ramp shift signal to the ramp generator in response to a detection signal that indicates activity of the set of switches in the power stage, wherein the ramp shift signal adjusts the first and second ramp signals relative to each other so as to minimize gap and overlap between the first and second ramp signals.

2. A converter as in claim 1, wherein the ramp generator includes current sources and capacitors for generating the ramp signals, and charge currents to the capacitors are modulated to increase or decrease the levels of the ramp signals.

3. A converter as in claim 2, wherein the level of the ramp signal for boost mode is shifted down to increase the overlap between the first and second ramp signals, and the level of the ramp signal for buck mode is shifted down to decrease the overlap between the first and second ramp signals.

4. A converter as in claim 2, wherein the ramp generator includes a current source that supplies a current proportional to the input voltage.

5. A converter as in claim 2, wherein the ramp generator includes a current source that supplies a current proportional to the output voltage.

6. A converter as in claim 2, wherein the ramp signal for buck mode has a rising slope and the ramp signal for boost mode has a falling slope.

7. A converter as in claim 6, wherein the ramp generator includes a current source that supplies a current proportional to the input voltage.

8. A converter as in claim 6, wherein the ramp generator includes a current source that supplies a current proportional to the output voltage.

9. A converter as in claim 3, wherein the level of the ramp signal for boost mode is shifted down to increase the overlap between the first and second ramp signals, and the level of the ramp signal for buck mode is shifted down to decrease the overlap between the first and second ramp signals.

10. A converter as in claim 9, wherein the ramp generator includes a current source that supplies a current proportional to the output voltage.

11. A converter as in claim 9, wherein the ramp generator includes a current source that supplies a current proportional to the input voltage.

12. A converter as in claim 11, wherein the ramp generator includes a current source that supplies a current proportional to the output voltage.

13. A converter as in claim 1, wherein the ramp signal for buck mode has a rising slope and the ramp signal for boost mode has a falling slope.

14. A converter as in claim 1, wherein the level of the ramp signal for boost mode is shifted down to increase the overlap between the first and second ramp signals, and the level of the ramp signal for buck mode is shifted down to decrease the overlap between the first and second ramp signals.

* * * * *